E. H. BOOTH.
Platform-Wagon.
No. 197,758. Patented Dec. 4, 1877.
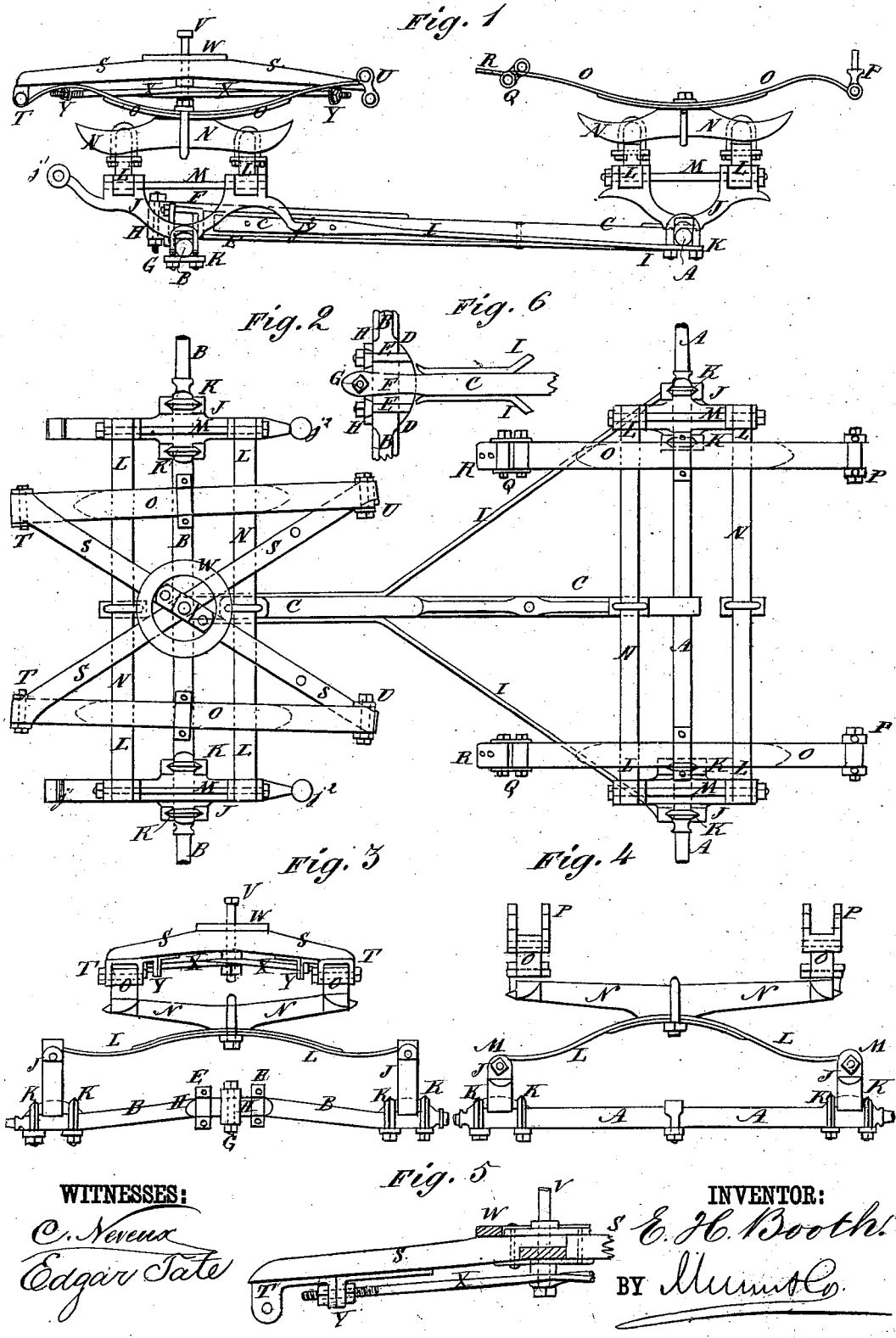
WITNESSES:
C. Neveux
Edgar Tate
INVENTOR:
E. H. Booth
BY Munn & Co.
ATTORNEYS.

UNITED STATES PATENT OFFICE.

EBENEZER H. BOOTH, OF WEST COLESVILLE, NEW YORK.

IMPROVEMENT IN PLATFORM-WAGONS.

Specification forming part of Letters Patent No. 197,758, dated December 4, 1877; application filed October 6, 1877.

*To all whom it may concern:*

Be it known that I, EBENEZER HOYT BOOTH, of West Colesville, in the county of Broome and State of New York, have invented a new and useful Improvement in Platform-Wagons, of which the following is a specification:

Figure 1 is a side view of the running-gear of a platform-wagon to which my improvement has been applied. Fig. 2 is a top view of the same. Fig. 3 is a front view of the same. Fig. 4 is a rear view of the same. Fig. 5 is a detail section of the upper part of the platform. Fig. 6 is a detail top view of the center of the forward axle and the forward end of the reach.

Similar letters of reference indicate corresponding parts.

The object of this invention is to furnish platform-wagons which shall be so constructed that the draft may be applied directly to the axle, that a reach may be used, that the rolling of the axle will be entirely prevented, and that the horses may be hitched much nearer to the load than is possible with the ordinary construction.

The invention will first be described in connection with the drawings, and then pointed out in the claims.

A represents the rear axle, and B represents the forward axle, which are connected together by the reach C.

The rear end of the reach C is secured to the center of the rear axle A by iron straps and bolts, or other suitable means.

The forward end of the reach C rests against the curved edge of a semicircular block, D, secured to the rear side of the center of the forward axle B by the clips E.

To the upper and lower sides of the forward ends of the reach C are attached iron straps F, which project across the upper and lower sides of the axle B, and have holes formed in their forward ends to receive the bolt G.

The bolt G passes through an eye in a plate, H, placed against the forward side of the axle B, and secured in place by the same clips E that secure the block D to said axle.

This construction connects the forward axle B securely to the forward end of the reach C, and, at the same time, allows said axle to work freely when turning the wagon. The reach C is strengthened by the braces I, the forward ends of which are bolted to the sides of the forward end of the said reach C, and their rear ends are secured by clips to the end parts of the axle A.

J are jacks, the middle parts of which are bent downward, and have notches or shoulders formed in their lower sides, to receive and fit upon the end parts of the axles A B.

Upon the sides of the middle parts of the jacks J are formed lugs to receive the clips K, by which said jacks are secured to the axles A B.

Upon the upper sides of the ends of the jacks J are formed two pairs of lugs, to receive the eyes of the two pairs of cross-springs L, and the long bolts M, by which said springs are secured in place.

Upon the forward ends of the forward jacks J are formed eyes $j^1$, to receive the pole or thill irons, thus connecting the draft directly to the axle B. Upon the rear ends of the forward jacks J are formed steps $j^2$.

The springs L are made in the form of half-elliptic springs, and their end parts have short reverse curves formed in them, to take up the extension when the said springs are put under tension, so that their ends will not be forced apart, and may be secured by eyes and bolts, avoiding the use of shackles, and preventing the swaying of the box when loaded.

N are two rectangular frames, the middle parts of the cross-bars of which are secured, by clips, to the centers of the springs L, and the middle parts of their side bars are secured by clips to the centers of the side springs O.

The rear parts of the rear side springs O are made with reverse bends, and are secured to the projecting ends of the rear cross-bar of the wagon-body by eyebolts P. The forward parts of the side springs O are made without the reverse bend, and are secured to the projecting ends of a cross-bar of the wagon-body by shackles Q and eye-plates R.

The forward ends of the forward side springs O are made with reverse curves, and have eyes formed in them, to receive the bolts by which they are secured to lugs T, attached to the under side of the forward ends of the bars S.

The rear ends of the forward side springs O are made without reverse curves, and are connected with the upper sides of the rear ends of the bars S by shackles U. The two bars S cross each other at the center, forming an X-frame, and to them, at the point of intersection, is attached the bolt V, by which the forward part of the gearing is connected with and pivoted to the forward part of the wagon-body.

To the middle part of the X-frame S is attached a ring-plate, W, for the wagon-body to rest and turn upon.

X are rods, which have holes formed through their centers, to receive the lower end of the king-bolt V, and which are secured upon said bolt by a nut. The rods X are placed beneath the bars S, and have screw-threads formed upon their ends. The ends of the rods X pass through lugs, attached to the under side of the end parts of the bars S, and are secured in place by nuts screwed upon them, upon both sides of the said lugs.

The X-frame S is made arched, or highest in its middle part, and is kept from being straightened out by the rods X. By this construction the arch of the frame S may be increased or decreased by adjusting the nuts upon the rods X, so that the wagon-body may be kept from touching any part of the frame S except the rub-plate W.

Having thus described my invention, I claim as new and desire to secure by Letters Patent—

1. The combination of forward axle B, reach C, blocks D, clips E, straps F, bolt G, and eye-plate H, as set forth.

2. The combination, with the wagon-body, of two frames, N, springs L O, X-frame S, having lugs T, bolt V, plate W, and the adjusting-rods X, as and for the purpose specified.

EBENEZER HOYT BOOTH.

Witnesses:
CHARLES BLATCHLEY,
J. W. BOOTH.